United States Patent
Bernbo et al.

(10) Patent No.: US 8,688,630 B2
(45) Date of Patent: Apr. 1, 2014

(54) DISTRIBUTED DATA STORAGE

(75) Inventors: Stefan Bernbo, Karlskrona (SE);
Christian Melander, Rodeby (SE);
Roger Persson, Karlskrona (SE);
Gustav Petersson, Sturkö (SE)

(73) Assignee: Compuverde AB (SE)

( * ) Notice: Subject to any disclaimer, the term of this patent is extended or adjusted under 35 U.S.C. 154(b) by 117 days.

(21) Appl. No.: 13/125,524

(22) PCT Filed: Oct. 21, 2009

(86) PCT No.: PCT/EP2009/063796
§ 371 (c)(1),
(2), (4) Date: Jul. 6, 2011

(87) PCT Pub. No.: WO2010/046393
PCT Pub. Date: Apr. 29, 2010

(65) Prior Publication Data
US 2011/0295807 A1    Dec. 1, 2011

(30) Foreign Application Priority Data
Oct. 24, 2008  (SE) ..................................... 0802277

(51) Int. Cl.
*G06F 17/30* (2006.01)
*G06F 15/173* (2006.01)

(52) U.S. Cl.
CPC .................. *G06F 17/30215* (2013.01)
USPC ........................................... 707/610; 709/233

(58) Field of Classification Search
None
See application file for complete search history.

(56) References Cited

U.S. PATENT DOCUMENTS

| | | | |
|---|---|---|---|
| 3,707,707 A | 12/1972 | Spencer et al. | |
| 6,003,065 A | 12/1999 | Yan et al. | |
| 6,055,543 A | 4/2000 | Christensen et al. | |
| 6,389,432 B1 | 5/2002 | Pothapragada et al. | |
| 6,470,420 B1 | 10/2002 | Hospodor | |
| 6,782,389 B1 | 8/2004 | Chrin et al. | |
| 6,925,737 B2 | 8/2005 | Bolduan et al. | |
| 6,952,737 B1 | 10/2005 | Coates et al. | |
| 6,985,956 B2* | 1/2006 | Luke et al. | 709/229 |

(Continued)

FOREIGN PATENT DOCUMENTS

| | | | |
|---|---|---|---|
| EP | 0774723 A3 | 5/1997 | |
| EP | 0934568 B1 | 8/1999 | |

(Continued)

OTHER PUBLICATIONS

Tang and Yang, "An Efficient Data Location Protocol for Self-organizing Storage Clusters", Supercomputing, ACM/IEEE Conference, Phoenix, AZ, USA, Nov. 15-21, 2003, 1-13.

(Continued)

*Primary Examiner* — Tarek Chbouki
(74) *Attorney, Agent, or Firm* — Condo Roccia LLP (57) ABSTRACT

The present invention relates to a distributed data storage system comprising a plurality of storage nodes. Using unicast and multicast transmission, a server application may read and write data in the storage system. Each storage node may monitor reading and writing operations on the system as well as the status of other storage nodes. In this way, the storage nodes may detect a need for replication of files on the system, and may carry out a replication process that serves to maintain a storage of a sufficient number of copies of files with correct versions at geographically diverse locations.

20 Claims, 7 Drawing Sheets

(56) References Cited

U.S. PATENT DOCUMENTS

| | | |
|---|---|---|
| 7,200,664 B2 | 4/2007 | Hayden |
| 7,206,836 B2 | 4/2007 | Dinker et al. |
| 7,266,556 B1 | 9/2007 | Coates |
| 7,320,088 B1* | 1/2008 | Gawali .................. 714/6.1 |
| 7,340,510 B1* | 3/2008 | Liskov et al. .............. 709/220 |
| 7,352,765 B2 | 4/2008 | Dai et al. |
| 7,406,484 B1 | 7/2008 | Srinivasan et al. |
| 7,487,305 B2 | 2/2009 | Hill et al. |
| 7,503,052 B2 | 3/2009 | Castro et al. |
| 7,546,486 B2 | 6/2009 | Slik et al. |
| 7,568,069 B2 | 7/2009 | Jantz et al. |
| 7,590,672 B2 | 9/2009 | Slik et al. |
| 7,593,966 B2 | 9/2009 | Therrien et al. |
| 7,624,155 B1 | 11/2009 | Nordin et al. |
| 7,624,158 B2 | 11/2009 | Slik et al. |
| 7,631,045 B2 | 12/2009 | Boerries et al. |
| 7,631,313 B2 | 12/2009 | Mayhew et al. |
| 7,634,453 B1 | 12/2009 | Bakke et al. |
| 7,647,329 B1 | 1/2010 | Fischman et al. |
| 7,769,711 B2 | 8/2010 | Srinivasan et al. |
| 7,778,972 B1 | 8/2010 | Cormie et al. |
| 7,822,766 B2 | 10/2010 | Arnid et al. |
| 7,840,992 B1* | 11/2010 | Dufrene et al. ................. 726/1 |
| 7,885,982 B2 | 2/2011 | Wight et al. |
| 8,073,881 B1 | 12/2011 | Georgiev |
| 8,190,561 B1 | 5/2012 | Poole et al. |
| 8,255,430 B2 | 8/2012 | Dutton et al. |
| 8,296,398 B2 | 10/2012 | Lacapra et al. |
| 8,417,828 B2 | 4/2013 | Ma et al. |
| 8,443,062 B2* | 5/2013 | Voutilainen et al. .......... 709/221 |
| 2001/0034812 A1 | 10/2001 | Ignatius et al. |
| 2001/0047400 A1 | 11/2001 | Coates et al. |
| 2002/0042693 A1 | 4/2002 | Kampe et al. |
| 2002/0103888 A1 | 8/2002 | Janz et al. |
| 2002/0145786 A1 | 10/2002 | Chang et al. |
| 2003/0026254 A1 | 2/2003 | Sim |
| 2003/0154238 A1* | 8/2003 | Murphy et al. .............. 709/201 |
| 2003/0172089 A1 | 9/2003 | Douceur et al. |
| 2004/0059805 A1 | 3/2004 | Dinker et al. |
| 2004/0064729 A1* | 4/2004 | Yellepeddy .................. 713/201 |
| 2004/0078466 A1 | 4/2004 | Coates et al. |
| 2004/0088297 A1 | 5/2004 | Coates et al. |
| 2004/0111730 A1 | 6/2004 | Apte |
| 2005/0010618 A1 | 1/2005 | Hayden |
| 2005/0015431 A1 | 1/2005 | Cherkasova |
| 2005/0015461 A1 | 1/2005 | Richard et al. |
| 2005/0038990 A1 | 2/2005 | Sasakura et al. |
| 2005/0177550 A1 | 8/2005 | Jacobs et al. |
| 2005/0193245 A1* | 9/2005 | Hayden et al. .................. 714/13 |
| 2005/0246393 A1 | 11/2005 | Coates et al. |
| 2005/0256894 A1 | 11/2005 | Talanis et al. |
| 2005/0278552 A1* | 12/2005 | Delisle et al. ................. 713/193 |
| 2005/0283649 A1 | 12/2005 | Turner et al. |
| 2006/0031439 A1 | 2/2006 | Saffre |
| 2006/0080574 A1* | 4/2006 | Saito et al. ....... 714/11 |
| 2006/0090045 A1 | 4/2006 | Bartlett et al. |
| 2006/0090095 A1* | 4/2006 | Massa et al. ....... 714/4 |
| 2006/0218203 A1* | 9/2006 | Yamato et al. ............... 707/200 |
| 2007/0022087 A1 | 1/2007 | Bahar et al. |
| 2007/0022121 A1 | 1/2007 | Bahar et al. |
| 2007/0022122 A1 | 1/2007 | Bahar et al. |
| 2007/0022129 A1 | 1/2007 | Bahar et al. |
| 2007/0055703 A1 | 3/2007 | Zimran et al. |
| 2007/0088703 A1 | 4/2007 | Kasiolas et al. |
| 2007/0094269 A1 | 4/2007 | Mikesell et al. |
| 2007/0094354 A1 | 4/2007 | Soltis |
| 2007/0198467 A1 | 8/2007 | Wiser et al. |
| 2007/0220320 A1* | 9/2007 | Sen et al. ......... 714/13 |
| 2007/0276838 A1 | 11/2007 | Abushanab et al. |
| 2007/0288494 A1 | 12/2007 | Chrin et al. |
| 2007/0288638 A1 | 12/2007 | Vuong et al. |
| 2008/0043634 A1 | 2/2008 | Wang et al. |
| 2008/0077635 A1 | 3/2008 | Sporny et al. |
| 2008/0104218 A1 | 5/2008 | Liang et al. |
| 2008/0109830 A1 | 5/2008 | Glotzbach et al. |
| 2008/0168157 A1 | 7/2008 | Marchand |
| 2008/0198752 A1 | 8/2008 | Fan et al. |
| 2008/0270822 A1 | 10/2008 | Fan et al. |
| 2009/0043922 A1 | 2/2009 | Crowther |
| 2009/0132543 A1 | 5/2009 | Chatley et al. |
| 2009/0172211 A1 | 7/2009 | Perry et al. |
| 2009/0172307 A1 | 7/2009 | Perry et al. |
| 2009/0271412 A1 | 10/2009 | Lacapra et al. |
| 2009/0287842 A1 | 11/2009 | Plamondon |
| 2010/0169391 A1 | 7/2010 | Baptist et al. |
| 2010/0169415 A1 | 7/2010 | Leggette et al. |
| 2010/0185693 A1 | 7/2010 | Murty et al. |
| 2010/0198888 A1 | 8/2010 | Blomstedt et al. |
| 2010/0198889 A1 | 8/2010 | Byers et al. |
| 2011/0055353 A1 | 3/2011 | Tucker et al. |
| 2011/0072206 A1 | 3/2011 | Ross et al. |
| 2011/0252204 A1 | 10/2011 | Coon et al. |
| 2012/0331021 A1 | 12/2012 | Lord |
| 2013/0103851 A1 | 4/2013 | Umeki et al. |

FOREIGN PATENT DOCUMENTS

| | | |
|---|---|---|
| EP | 1521189 A2 | 4/2005 |
| EP | 1578088 A2 | 9/2005 |
| EP | 1669850 A1 | 6/2006 |
| EP | 1798934 A1 | 6/2007 |
| EP | 2031513 A2 | 3/2009 |
| EP | 2031513 A3 | 3/2009 |
| JP | 06-348527 A | 12/1994 |
| JP | 11-249874 A | 9/1999 |
| JP | 2000-3222292 A | 11/2000 |
| JP | 2003-030012 A | 1/2003 |
| JP | 2003-223286 A | 8/2003 |
| JP | 2003-248607 A | 9/2003 |
| JP | 2003-271316 A | 9/2003 |
| JP | 2007-058275 A | 3/2007 |
| JP | 2008-250767 A | 10/2008 |
| JP | 2009-259007 A | 11/2009 |
| WO | WO-99/38093 | 7/1999 |
| WO | WO 99/38093 A1 | 7/1999 |
| WO | WO-01/18633 A1 | 3/2001 |
| WO | WO-02/35359 A2 | 5/2002 |
| WO | WO 02/44835 | 6/2002 |
| WO | WO-2004/053677 A2 | 6/2004 |
| WO | WO 2006/124911 A2 | 11/2006 |
| WO | WO-2006/124911 A2 | 11/2006 |
| WO | WO 2007/014296 A2 | 2/2007 |
| WO | WO 2007/115317 A2 | 10/2007 |
| WO | WO-2007/134918 A1 | 11/2007 |
| WO | WO-2008/069811 A1 | 6/2008 |
| WO | WO 2008/102195 | 8/2008 |
| WO | WO 2009/048726 A1 | 4/2009 |
| WO | WO 2010/046393 | 4/2010 |
| WO | WO 2010/046393 A2 | 4/2010 |
| WO | WO 2010/080533 A2 | 7/2010 |
| WO | WO 2011/131717 A1 | 10/2011 |

OTHER PUBLICATIONS

Weatherspoon, et al., "Antiquity: Exploiting a Secure Log for Wide-Area Distributed Storage", Proceedings of the 2007 EuroSys Conference, Lisbon, Portugal, Mar. 21-23, 2007, ACM 2007, 371-384.
U.S. Appl. No. 13/170,672, filed Jun. 28, 2011, Bernbo et al.
U.S. Appl. No. 13/170,735, filed Jun. 28, 2011, Bernbo et al.
U.S. Appl. No. 13/174,350, filed Jun. 30, 2011, Bernbo et al.
U.S. Appl. No. 13/224,393, filed Sep. 2, 2011, Bernbo et al.
U.S. Appl. No. 13/224,404, filed Sep. 2, 2011, Bernbo et al.
U.S. Appl. No. 13/224,415, filed Sep. 2, 2011, Bernbo et al.
U.S. Appl. No. 13/224,424, filed Sep. 2, 2011, Bernbo et al.
U.S. Appl. No. 13/224,433, filed Sep. 2, 2011, Bernbo et al.
U.S. Appl. No. 13/224,446, filed Sep. 2, 2011, Bernbo et al.
Anonymous: "Squid configuration directive reply_body_max_size", Dec. 21, 2008, pp. 1-2. XP55042055, Retrieved from the Internet: URL:http://web.archive.org/web/20081221142145/http://www.squid-cache.org/Doc/config/reply_body_max_size/ [retrieved on Oct. 24, 2012], p. 1.

(56) References Cited

OTHER PUBLICATIONS

Anonymous: "FAQ: How do I block large files by Content Size before download?", Mar. 23, 2009, pp. 1-2, XP55042048, Retrieved from the Internet: URL:http://www.trustwave.com/support/kb/article.aspx?id=13166, [retrieved on Oct. 24, 2012], p. 1.

Anonymous: "Queues for Prioritized Message Processing", Feb. 6, 2009, p. 1, XP55042195, Retrieved from the Internet: URL:http://web.archive.org/web/20090206110207/http://help.sap.com/saphelp_nw04/helpdata/en/04/827440c36ed562e10000000a155106/content.htm, [retrieved on Oct. 25, 2012], p. 1.

Chi Zhang et al: "Brushwood: Distributed Trees in Peer-to-Peer Systems", 2005, Peer-To-Peer Systems IV Lecture Notes in Computer Science;; LNCS, Springer, Berlin, DE, p. 47-57, XP019019955, ISBN: 978-3-540-29068-1, sections 1-3.

Anonymous: "FastTrack", Jan. 8, 2011, pp. 1-3, XP55041807, Retrieved from the Internet: URL:http://de.wikipedia.org/w/index.php?title=FastTrack&oldid=83614953 [retrieved on Oct. 22, 2012], pp. 1-2.

Anonymous: "Load balancing (computing)", Aug. 25, 2011, pp. 1-6, XP55041742, Retrieved from the Internet: URL:http://en.wikipedia.org/w/index.php?title=Load_balancing_%28computing%29&oldid=446655159 [retrieved on Oct. 22, 2012], pp. 1-5.

Nancy P. Kronenberg et al., "VAXclusters: A Closely-Coupled Distributed System, ACM Transactions on Computer Systems", vol. 4, No. 2, May 1986, pp. 130-146.

HP Volume Shadowing for OpenVMS, "Introduction to Volume Shadowing for OpenVMS", OpenVMS Alpha 7.3-2, Sep. 2003.

Keith Parris, "Using OpenVMS Clusters for Diaster Tolerance", HP Services—Systems Engineering.

Wataru Katsurashima et al., "NAS Switch: A novel CIFS server virtualization", IEEE, 2003.

* cited by examiner

DISTRIBUTED DATA STORAGE

CROSS-REFERENCE TO RELATED APPLICATIONS

This application is the National Stage of PCT Application No. PCT/EP2009/063796, filed 21 Oct. 2009, which claims the benefit of Sweden Application No. 0802277-4 filed 24 Oct. 2008, the disclosures of which are incorporated herein by reference in their entirety.

TECHNICAL FIELD

The present disclosure relates to methods for writing and maintaining data in a data storage system comprising a plurality of data storage nodes, the methods being employed in a server and in a storage node in the data storage system. The disclosure further relates to storage nodes or servers capable of carrying out such methods.

BACKGROUND

Such a method is disclosed e.g. in US, 2005/0246393, A1. This method is disclosed for a system that uses a plurality of storage centres at geographically disparate locations. Distributed object storage managers are included to maintain information regarding stored data.

One problem associated with such a system is how to accomplish simple and yet robust and reliable writing as well as maintenance of data.

SUMMARY OF THE INVENTION

One object of the present disclosure is therefore to realise robust writing or maintenance of data in a distributed storage system, without the use of centralised maintenance servers, which may themselves be a weak link in a system. This object is achieved by means a method of the initially mentioned kind which is accomplished in a storage node and comprises: monitoring the status of other storage nodes in the system as well as writing operations carried out in the data storage system, detecting, based on the monitoring, conditions in the data storage system that imply the need for replication of data between the nodes in the data storage system, and initiating a replication process in case such a condition is detected. The replication process includes sending a multicast message, to a plurality of storage nodes, the message enquiring which of those storage nodes store specific data.

By means of such a method, each storage node can be active with maintaining data of the entire system. In case a storage node fails, its data can be recovered by other nodes in the system, which system may therefore considered to be self-healing.

The monitoring may include listening to heartbeat signals from other storage nodes in the system. A condition that implies need for replication is then a malfunctioning storage node.

The data includes files and a condition implying need for replications may then be one of a file deletion or a file inconsistency.

A replication list, including files that need replication, may be maintained and may include priorities.

The replication process may include: sending a multicast message to a plurality of storage nodes request enquiring which of those storage nodes store specific data, receiving responses from those storage nodes that contain said specific data, determining whether said specific data is stored on a sufficient number of storage nodes, and, if not, selecting at least one additional storage node and transmitting said specific data to that storage node. Further, the specific data on storage nodes containing obsolete versions thereof may be updated.

Additionally, the replication process may begin with the storage node attempting to attain mastership for the file, to be replicated, among all storage nodes in the system.

The monitoring may further include monitoring of reading operations carried out in the data storage system.

The present disclosure further relates to a data storage node, for carrying out maintenance of data, corresponding to the method. The storage node then generally comprises means for carrying out the actions of the method.

The object is also achieved by means of a method for writing data to a data storage system of the initially mentioned kind, which is accomplished in a server running an application which accesses data in the data storage system. The method comprises: sending a multicast storage query to a plurality of storage nodes, receiving a plurality of responses from a subset of said storage nodes, the responses including geographic data relating to the geographic position of each server, selecting at least two storage nodes in the subset, based on said responses, and sending data and a data identifier, corresponding to the data, to the selected storage nodes.

This method accomplishes robust writing of data in the sense that a geographic diversity is realised in an efficient way.

The geographic position may include latitude and longitude of the storage node in question, and the responses may further include system load and/or system age for the storage node in question.

The multicast storage query may include a data identifier, identifying the data to be stored.

Typically, at least three nodes may be selected for storage, and a list of storage nodes, successfully storing the data, may be sent to the selected storage nodes.

The present disclosure further relates to a server, for carrying out writing of data, corresponding to the method. The server then generally comprises means for carrying out the actions of the method.

DETAILED DESCRIPTION

The present disclosure is related to a distributed data storage system comprising a plurality of storage nodes. The structure of the system and the context in which it is used is outlined in FIG. 1.

Figure 1:
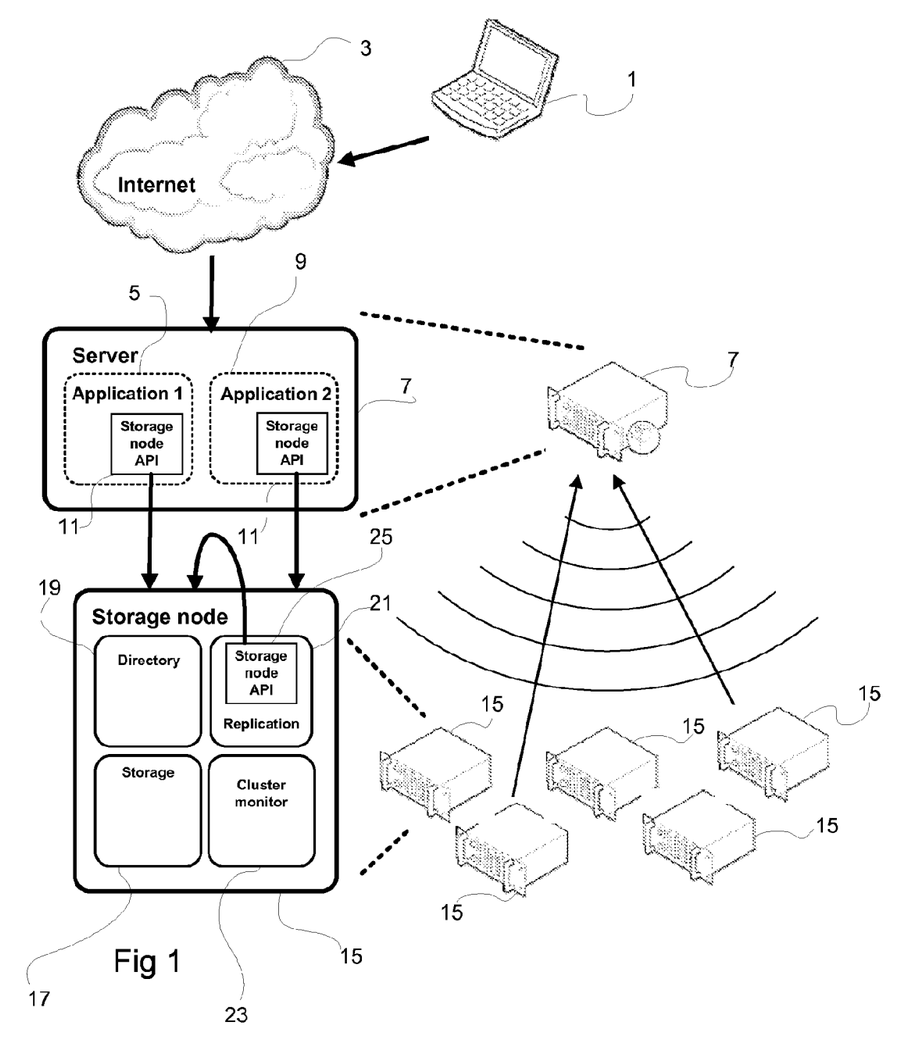
FIG. 1 illustrates a distributed data storage system.

A user computer 1 accesses, via the Internet 3, an application 5 running on a server 7. The user context, as illustrated here, is therefore a regular client-server configuration, which is well known per se. However, it should be noted that the data storage system to be disclosed may be useful also in other configurations.

In the illustrated case, two applications 5, 9 run on the server 7. Of course however, this number of applications may be different. Each application has an API (Application Programming Interface) 11 which provides an interface in relation to the distributed data storage system 13 and supports requests, typically write and read requests, from the applications running on the server. From an application's point of view, reading or writing information from/to the data storage system 13 need not appear different from using any other type of storage solution, for instance a file server or simply a hard drive.

Each API 11 communicates with storage nodes 15 in the data storage system 13, and the storage nodes communicate with each other. These communications are based on TCP (Transmission Control Protocol) and UDP (User Datagram Protocol). These concepts are well known to the skilled person, and are not explained further.

It should be noted that different APIs 11 on the same server 7 may access different sets of storage nodes 15. It should further be noted that there may exist more than one server 7 which accesses each storage node 15. This, however does not to any greater extent affect the way in which the storage nodes operate, as will be described later.

The components of the distributed data storage system are the storage nodes 15 and the APIs 11, in the server 7 which access the storage nodes 15. The present disclosure therefore relates to methods carried out in the server 7 and in the storage nodes 15. Those methods will primarily be embodied as software implementations which are run on the server and the storage nodes, respectively, and are together determining for the operation and the properties of the overall distributed data storage system.

The storage node 15 may typically be embodied by a file server which is provided with a number of functional blocks. The storage node may thus comprise a storage medium 17, which typically comprises of a number of hard drives, optionally configured as a RAID (Redundant Array of Independent Disk) system. Other types of storage media are however conceivable as well.

The storage node 15 may further include a directory 19, which comprises lists of data entity/storage node relations as a host list, as will be discussed later.

In addition to the host list, each storage node further contains a node list including the IP addresses of all storage nodes in its set or group of storage nodes. The number of storage nodes in a group may vary from a few to hundreds of storage nodes. The node list may further have a version number.

Additionally, the storage node 15 may include a replication block 21 and a cluster monitor block 23. The replication block 21 includes a storage node API 25, and is configured to execute functions for identifying the need for and carrying out a replication process, as will be described in detail later. The storage node API 25 of the replication block 21 may contain code that to a great extent corresponds to the code of the server's 7 storage node API 11, as the replication process comprises actions that correspond to a great extent to the actions carried out by the server 7 during reading and writing operations to be described. For instance, the writing operation carried out during replication corresponds to a great extent to the writing operation carried out by the server 7. The cluster monitor block 23 is configured to carry out monitoring of other storage nodes in the data storage system 13, as will be described in more detail later.

The storage nodes 15 of the distributed data storage system can be considered to exist in the same hierarchical level. There is no need to appoint any master storage node that is responsible for maintaining a directory of stored data entities and monitoring data consistency, etc. Instead, all storage nodes 15 can be considered equal, and may, at times, carry out data management operations vis-à-vis other storage nodes in the system. This equality ensures that the system is robust. In case of a storage node malfunction other nodes in the system will cover up the malfunctioning node and ensure reliable data storage.

The operation of the system will be described in the following order: reading of data, writing of data, and data maintenance. Even though these methods work very well together, it should be noted that they may in principle also be carried out independently of each other. That is, for instance the data reading method may provide excellent properties even if the data writing method of the present disclosure is not used, and vice versa.

The reading method is now described with reference to FIGS. 2A-2C and 3, the latter being a flowchart illustrating the method.

The reading, as well as other functions in the system, utilise multicast communication to communicate simultaneously with a plurality of storage nodes. By a multicast or IP multicast is here meant a point-to-multipoint communication which is accomplished by sending a message to an IP address which is reserved for multicast applications.

For example, a message, typically a request, is sent to such an IP address (e.g. 244.0.0.1), and a number of recipient servers are registered as subscribers to that IP address. Each of the recipient servers has its own IP address. When a switch in the network receives the message directed to 244.0.0.1, the switch forwards the message to the IP addresses of each server registered as a subscriber.

In principle, only one server may be registered as a subscriber to a multicast address, in which case a point-to-point, communication is achieved. However, in the context of this disclosure, such a communication is nevertheless considered a multicast communication since a multicast scheme is employed.

Unicast communication is also employed referring to a communication with a single recipient.

Figure 2A:
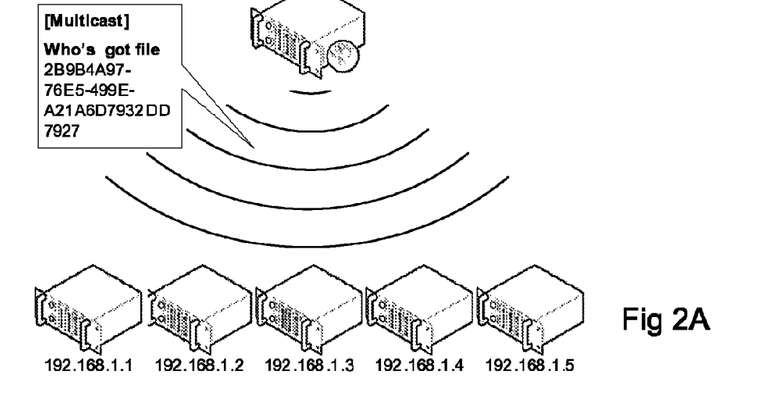
FIGS. 2A-2C, and FIG. 3 illustrate a data reading process.
Figure 2B:
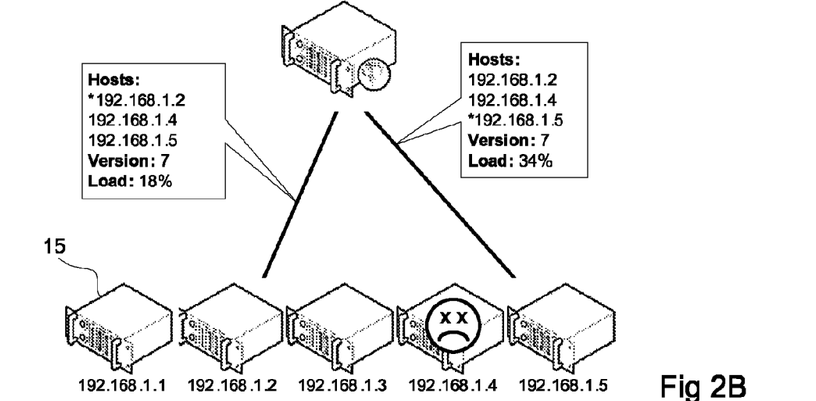
Figure 3:
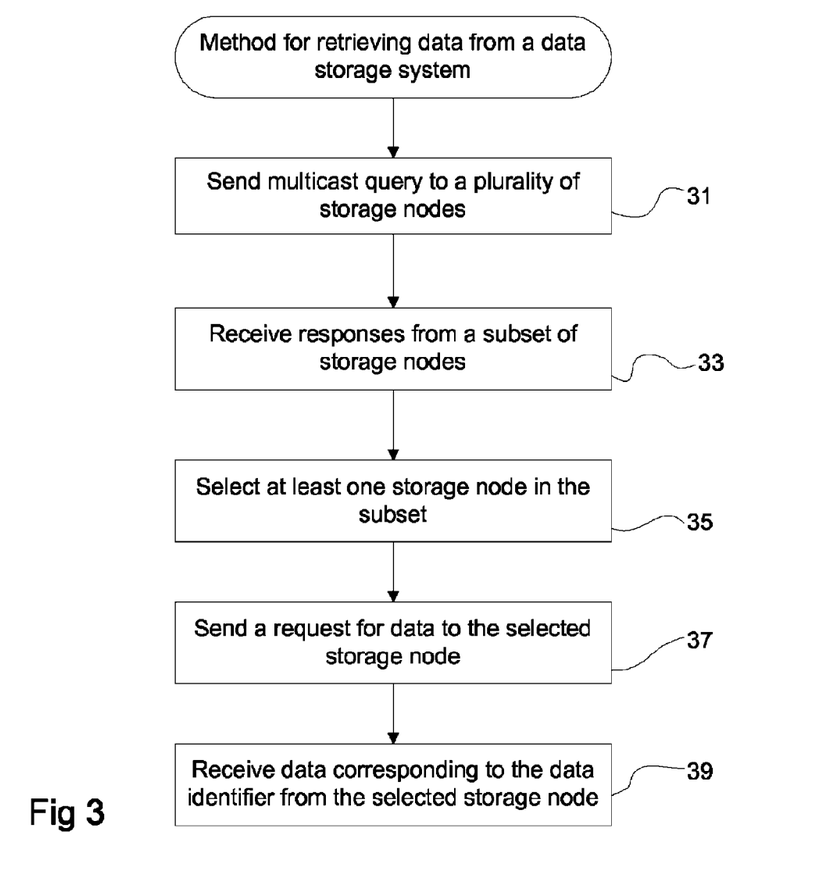

With reference to FIG. 2A and FIG. 3, the method for retrieving data from a data storage system comprises the sending 31 of a multicast query to a plurality of storage nodes 15. In the illustrated case there are five storage nodes each having an IP (Internet Protocol) address 192.168.1.1, 192.168.1.2, etc. The number of storage nodes is, needless to say, just an example. The query contains a data identifier "2B9B4A97-76E5-499E-A21A6D7932DD7927", which may for instance be a Universally Unique Identifier, UUID, which is well known per se.

The storage nodes scan themselves for data corresponding to the identifier. If such data is found, a storage node sends a response, which is received 33 by the server 7, cf. FIG. 2B. As illustrated, the response may optionally contain further information in addition to an indication that the storage node has a copy of the relevant data. Specifically, the response may contain information from the storage node directory about other storage nodes containing the data, information regarding which version of the data is contained in the storage node, and information regarding which load the storage node at present is exposed to.

Figure 2C:
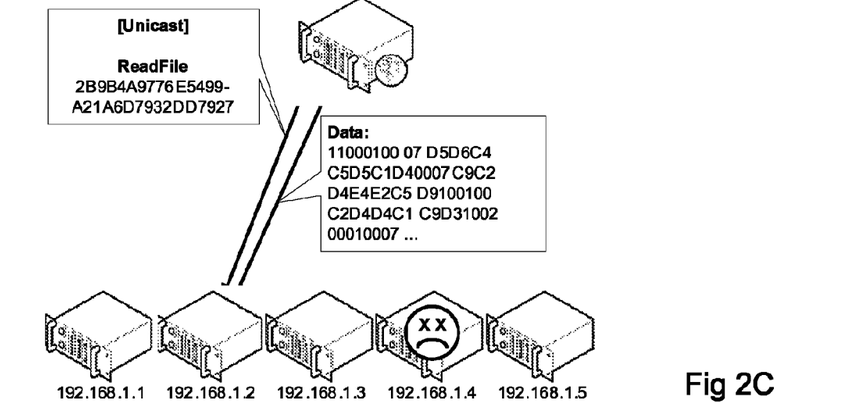

Based on the responses, the server selects 35 one or more storage nodes from which data is to be retrieved, and sends 37 a unicast request for data to that/those storage nodes, cf. FIG. 2C.

In response to the request for data, the storage node/nodes send the relevant data by unicast to the server which receives 39 the data. In the illustrated case, only one storage node is selected. While this is sufficient, it is possible to select more than one storage node in order to receive two sets of data which makes a consistency check possible. If the transfer of data fails, the server may select another storage node for retrieval.

The selection of storage nodes may be based on an algorithm that take several factors into account in order to achieve a good overall system performance. Typically, the storage node having the latest data version and the lowest load will be selected although other concepts are fully conceivable.

Optionally, the operation may be concluded by server sending a list to all storage nodes involved, indicating which nodes contains the data and with which version. Based on this information, the storage nodes may themselves maintain the data properly by the replication process to be described.

FIGS. 4A-4C, and FIG. 5 illustrate a data writing process for the distributed data storage system.

Figure 4A:
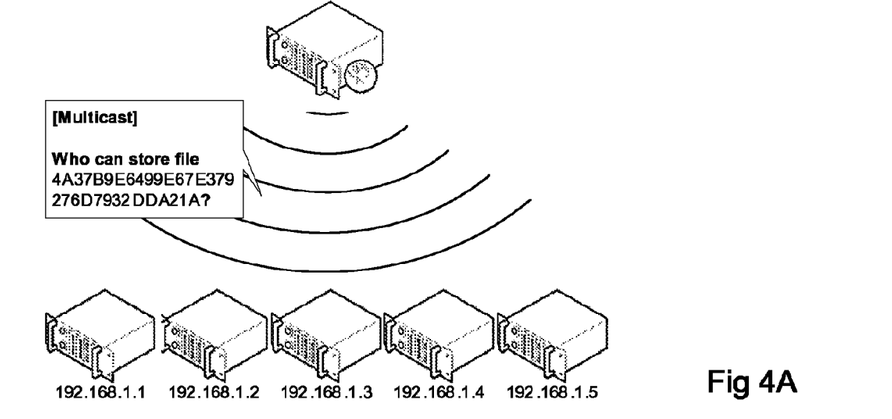
FIGS. 4A-4C, and FIG. 5 illustrate a data writing process.
Figure 5:
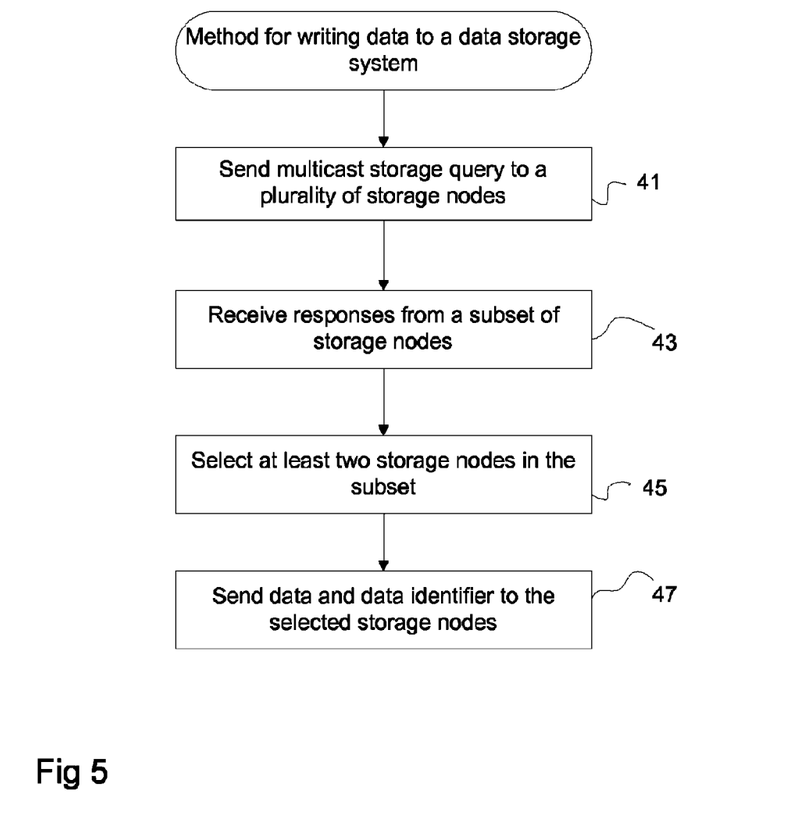

With reference to FIG. 4A and FIG. 5 the method comprises a server sending 41 a multicast storage query to a plurality of storage nodes. The storage query comprises a data identifier and basically consists of a question whether the receiving storage nodes can store this file. Optionally, the storage nodes may check with their internal directories whether they already have a file with this name, and may notify the server 7 in the unlikely event that this is the case, such that the server may rename the file.

Figure 4B:
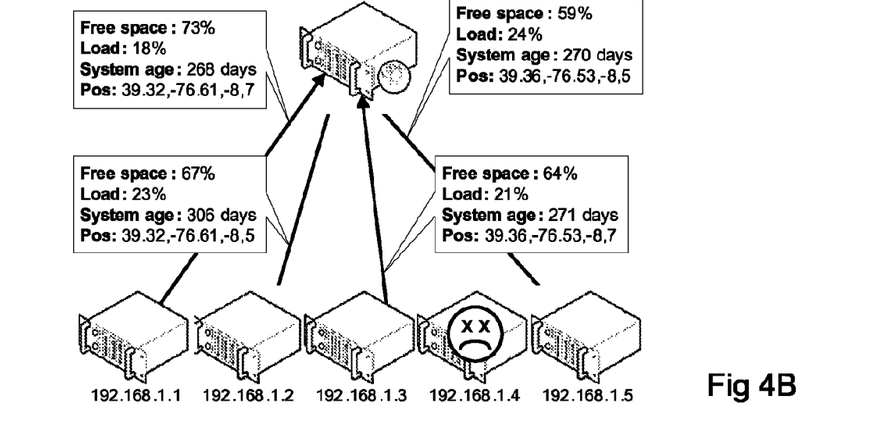

In any case, at least a subset of the storage nodes will provide responses by unicast transmission to the server 7. Typically, storage nodes having a predetermined minimum free disk space will answer to the query. The server 7 receives 43 the responses which include geographic data relating to the geographic position of each server. For instance, as indicated in FIG. 4B, the geographic data may include the latitude, the longitude and the altitude of each server. Other types of geographic data may however also be conceivable, such as a ZIP code or the like.

In addition to the geographic data, further information may be provided that serves as an input to a storage node selection process. In the illustrated example, the amount of free space in each storage node is provided together with an indication of the storage node's system age and an indication of the load that the storage node currently experiences.

Figure 4C:
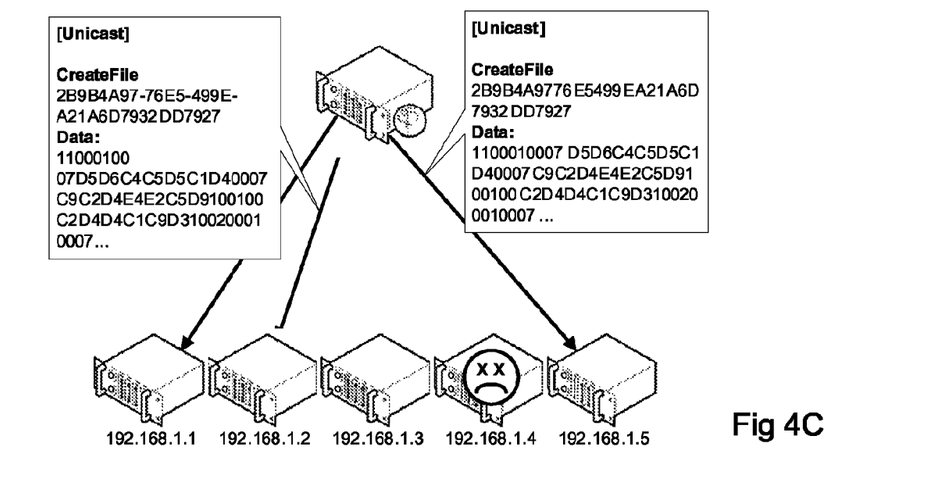

Based on the received responses, the server selects 45 at least two, in a typical embodiment three, storage nodes in the subset for storing the data. The selection of storage nodes is carried out by means of an algorithm that take different data into account. The selection is carried out in order to achieve some kind of geographical diversity. At least it should preferably be avoided that only file servers in the same rack are selected as storage nodes. Typically, a great geographical diversity may be achieved, even selecting storage nodes on different continents. In addition to the geographical diversity, other parameters may be included in the selection algorithm. As long as a minimum geographic diversity is achieved, free space, system age and current load may also be taken into account.

When the storage nodes have been selected, the data to be stored and a corresponding data identifier is sent to each selected node, typically using a unicast transmission.

Optionally, the operation may be concluded by each storage node, which has successfully carried out the writing operation, sending an acknowledgement to the server. The server then sends a list to all storage nodes involved indicating which nodes have successfully written the data and which have not. Based on this information, the storage nodes may themselves maintain the data properly by the replication process to be described. For instance if one storage node's writing failed, there exists a need to replicate the file to one more storage node in order to achieve the desired number of storing storage nodes for that file.

The data writing method in itself allows an API in a server 7 to store data in a very robust way, as excellent geographic diversity may be provided.

In addition to the writing and reading operations, the API in the server 7 may carry out operations that delete files and update files. These processes will be described in connection with the data maintenance process below.

The aim of the data maintenance process is to make sure that a reasonable number of non-malfunctioning storage nodes each store the latest version of each file. Additionally, it may provide the function that no deleted files are stored at any storage node. The maintenance is carried out by the storage nodes themselves. There is thus no need for a dedicated "master" that takes responsibility for the maintenance of the data storage. This ensures improved reliability as the "master" would otherwise be a weak spot in the system.

Figure 6:
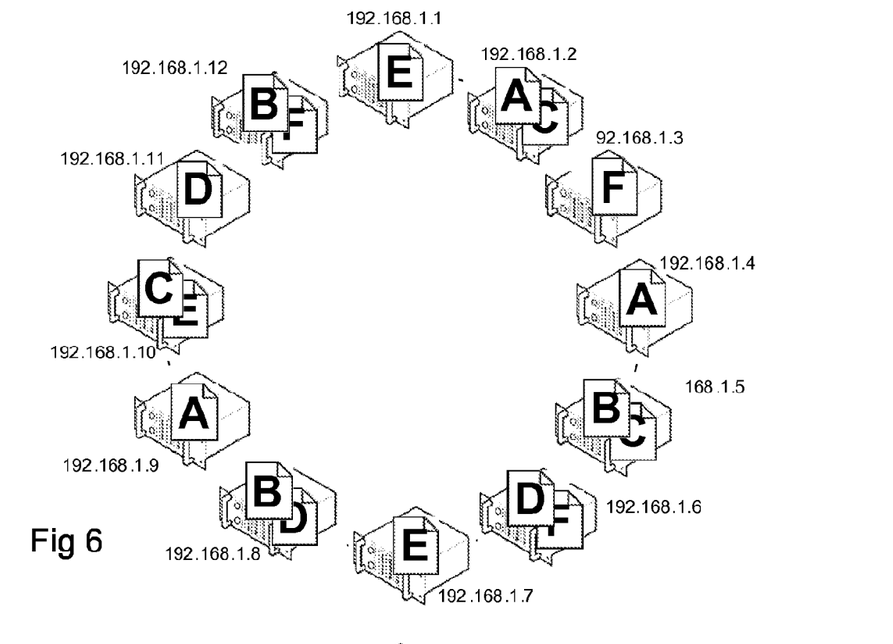
FIG. 6 illustrates schematically a situation where a number of files are stored among a number of data storage nodes.

FIG. 6 illustrates schematically a situation where a number of files are stored among a number of data storage nodes. In the illustrated case, twelve nodes, having IP addresses consecutively numbered from 192.168.1.1 to 192.168.1.12, are depicted for illustration purposes. Needless to say however, the IP address numbers need not be in the same range at all. The nodes are placed in a circular order only to simplify the description, i.e. the nodes need not have any particular order. Each node store one or two files identified, for the purpose of simplicity, by the letters A-F.

Figure 8:
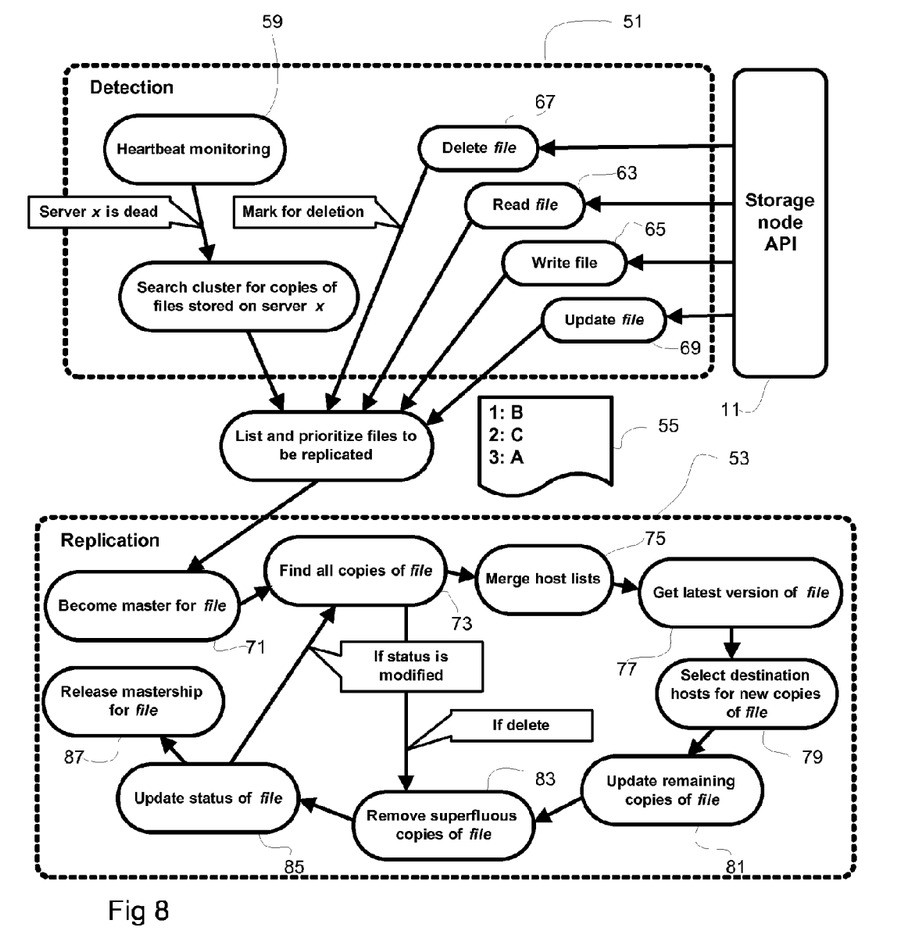
FIG. 8 is an overview of a data maintenance process.

With reference to FIG. 8, the method for maintaining data comprises the detecting 51 conditions in the data storage system that imply the need for replication of data between the nodes in the data storage system, and a replication process 53. The result of the detection process 51 is a list 55 of files for which the need for replication has been identified. The list may further include data regarding the priority of the different needs for replication. Based on this list the replication process 53 is carried out.

The robustness of the distributed storage relies on that a reasonable number of copies of each file, correct versions, are stored in the system. In the illustrated case, three copies of each file is stored. However, should for instance the storage node with the address 192.168.1.5 fail, the desired number of stored copies for files "B" and "C" will be fallen short of.

One event that results in a need for replication is therefore the malfunctioning of a storage node in the system.

Figure 7:
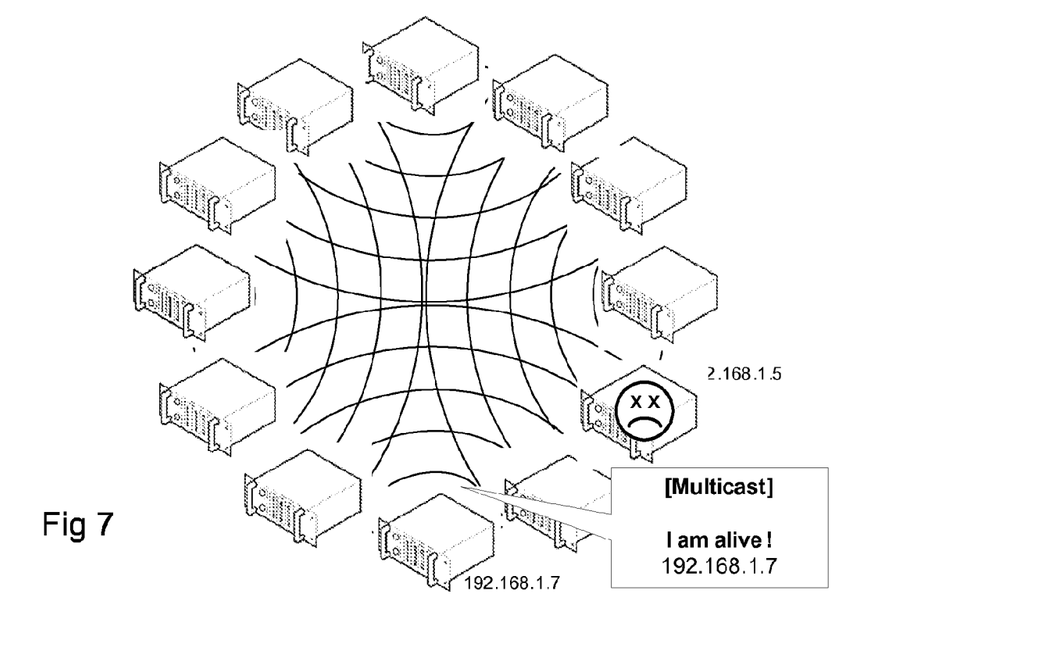
FIG. 7 illustrates the transmission of heartbeat signals.

Each storage node in the system may monitor the status of other storage nodes in the system. This may be carried out by letting each storage node emit a so-called heartbeat signal at regular intervals, as illustrated in FIG. 7. In the illustrated case, the storage node with address 192.168.1.7 emits a multicast signal 57 to the other storage nodes in the system, indicating that it is working correctly. This signal may be received by all other functioning storage nodes in the system carrying out heartbeat monitoring 59 (cf. FIG. 8), or a subset thereof. In the case with the storage node with address 192.168.1.5 however, this node is malfunctioning and does not emit any heartbeat signal. Therefore, the other storage nodes will notice that no heartbeat signal has been emitted by this node in a long time which indicates that the storage node in question is down.

The heartbeat signal may, in addition to the storage node's address, include its node list version number. Another storage node, listening to the heartbeat signal and finding out that the transmitting storage node has a later version node list, may then request that transmitting storage node to transfer its node list. This means that addition and removal of storage nodes can be obtained simply by adding or removing a storage node and sending a new node list version to one single storage node. This node list will then spread to all other storage nodes in the system.

Again with reference to FIG. 8, each storage node searches 61 its internal directory for files that are stored by the malfunctioning storage node. Storage nodes which themselves store files "B" and "C" will find the malfunctioning storage node and can therefore add the corresponding file on their lists 55.

The detection process may however also reveal other conditions that imply the need for replicating a file. Typically such conditions may be inconsistencies, i.e. that one or more storage nodes has an obsolete version of the file. A delete operation also implies a replication process as this process may carry out the actual physical deletion of the file. The server's delete operation then only need make sure that the storage nodes set a deletion flag for the file in question. Each node may therefore monitor reading and writing operations carried out in the data storage system. Information provided by the server 7 at the conclusion of reading and writing operations, respectively, may indicate that one storage node contains an obsolete version of a file (in the case of a reading operation) or that a storage node did not successfully carry out a writing operation. In both cases there exists a need for maintaining data by replication such that the overall objects of the maintenance process are fulfilled.

In addition to the basic reading and writing operations 63, 65, at least two additional processes may provide indications that a need for replication exists, namely the deleting 67 and updating 69 processes that are now given a brief explanation.

The deleting process is initiated by the server 7 (cf. FIG. 1). Similar to the reading process, the server sends a query by multicasting to all storage nodes, in order to find out which storage nodes has data with a specific data identifier. The storage nodes scan themselves for data with the relevant identifier, and respond by a unicast transmission if they have the data in question. The response may include a list, from the storage node directory, of other storage nodes containing the data. The server 7 then sends a unicast request, to the storage nodes that are considered to store the file, that the file be deleted. Each storage node sets a flag relating to the file and indicating that it should be deleted. The file is then added to the replication list, and an acknowledgement is sent to the server. The replication process then physically deletes the file as will be described.

The updating process has a search function, similar to the one of the deleting process, and a writing function, similar to the one carried out in the writing process. The server sends a query by multicasting to all storage nodes, in order to find out which storage nodes has data with a specific data identifier. The storage nodes scan themselves for data with the relevant identifier, and respond by a unicast transmission if they have the data in question. The response may include a list, from the storage node directory, of other storage nodes containing the data. The server 7 then sends a unicast request, telling the storage nodes to update the data. The request of course contains the updated data. The storage nodes updating the data sends an acknowledgement to the server, which responds by sending a unicast transmission containing a list with the storage nodes that successfully updated the data, and the storage nodes which did not. Again, this list can be used by the maintenance process.

Again with reference to FIG. 8 the read 63, write 65, delete 67, and update 69 operations may all indicate that a need for replication exists. The same applies for the heartbeat monitoring 59. The overall detection process 51 thus generates data regarding which files need be replicated. For instance, a reading or updating operation may reveal that a specific storage node contains an obsolete version of a file. A deletion process may set a deletion flag for a specific file. The heartbeat monitoring may reveal that a number of files, stored on a malfunctioning storage node need be replicated to a new storage node.

Each storage nodes monitors the need for replication for all the files it stores and maintains a replication list 55. The replication list 55 thus contains a number of files that need be replicated. The files may be ordered in correspondence with the priority for each replication. Typically, there may be three different priority levels. The highest level is reserved for files which the storage node holds the last online copy of. Such a file need be quickly replicated to other storage nodes such that a reasonable level of redundancy may be achieved. A medium level of priority may relate to files where the versions are inconsistent among the storage nodes. A lower level of priority may relate to files which are stored on a storage node that is malfunctioning.

The storage node deals with the files on the replication list 55 in accordance with their level of priority. The replication process is now described for a storage node which is here called the operating storage node, although all storage nodes may operate in this way.

The replication part 53 of the maintaining process starts with the operating storage node attempting 71 to become the master for the file it intends to replicate. The operating storage nodes sends a unicast request to become master to other storage nodes that are known store the file in question. The directory 19 (cf. FIG. 1) provides a host list comprising information regarding which storage nodes to ask. In the event, for instance in case of a colliding request, that one of the storage nodes does not respond affirmatively, the file is moved back to the list for the time being, and an attempt is instead made with the next file on the list. Otherwise the operating storage node is considered to be the master of this file and the other storage nodes set a flag indicating that the operating storage node is master for the file in question.

The next step is to find 73 all copies of the file in question in the distributed storage system. This may be carried out by the operating storage node sending a multicast query to all storage nodes, asking which ones of them have the file. The storage nodes having the file submit responses to the query, containing the version of the file they keep as well as their host lists, i.e. the list of storage nodes containing the relevant file that is kept in the directory of each storage node. These host lists are then merged 75 by the operating storage node, such that a master host list is formed corresponding to the union of all retrieved host lists. If additional storage nodes are found, which were not asked when the operating storage node attempted to become master, that step may now be repeated for the additional storage nodes. The master host list contains information regarding which versions of the file the different storage nodes keep and illustrate the status of the file within the entire storage system.

Should the operating storage node not have the latest version of the file in question, this file is then retrieved 77 from one of the storage nodes that do have the latest version.

The operating storage node then decides 79 whether the host list need to be changed, typically if additional storage nodes should be added. If so, the operating storage node may carry out a process very similar to the writing process as carried out by the server and as described in connection with FIGS. 4A-4C, and 5. The result of this process is that the file is written to a new storage node.

In case of version inconsistencies, the operating storage node may update 81 copies of the file that are stored on other storage nodes, such that all files stored have the correct version.

Superfluous copies of the stored file may be deleted 83. If the replication process is initiated by a delete operation, the process may jump directly to this step. Then, as soon as all storage nodes have accepted the deletion of the file, the operating storage node simply requests, using unicast, all storage nodes to physically delete the file in question. The storage nodes acknowledge that the file is deleted.

Further the status, i.e. the master host list of the file is updated. It is then optionally possible to repeat steps 73-83 to make sure that the need for replication no longer exists. This repetition should result in a consistent master host list that need not be updated in step 85.

Thereafter, the replication process for that file is concluded, and the operating storage node may release 87 the status as master of the file by sending a corresponding message to all other storage nodes on the host list.

This system where each storage node takes responsibility for maintaining all the files it stores throughout the set of storage nodes provides a self-repairing (in case of a storage node malfunction) self-cleaning (in case of file inconsistencies or files to be deleted) system with excellent reliability. It is easily scalable and can store files for a great number of different applications simultaneously.

The invention is not restricted to the specific disclosed examples and may be varied and altered in different ways within the scope of the appended claims.

The invention claimed is:

1. A method for maintaining data in a data storage system that includes a plurality of data storage nodes, the method being employed in a first data storage node in the data storage system, the method comprising:
    the first data storage node monitoring two or more other storage nodes, wherein a node list stored at the first data storage node indicates that the two or more other storage nodes are members of a storage group, the first data storage node is also a member of the storage group, and each member of the storage group is configured to monitor the other members of the storage group in order to determine whether locally stored data needs to be replicated among the members of the storage group;
    the first data storage node detecting, based on the monitoring, conditions in the data storage system that indicate that at least one storage node included on the node list is malfunctioning;
    the first data storage node performing a local search of host lists stored on the first data storage node, and the first storage node determining that a data entity that is stored on the first data storage node is to be replicated based on a host list for the data entity indicating that the data entity was stored on the at least one malfunctioning storage node, wherein the host list for the data entity comprises an associated list identifying a subset of storage nodes within the storage group that store the data entity, and each of a plurality of data entities that are stored on the data storage node are associated with a corresponding host list that indicates which storage nodes store a corresponding data entity; and
    the first data storage node initiating a replication process for the data entity based on detecting that the at least one storage node is malfunctioning and the host list for the data entity indicating that the data entity was stored on the at least one malfunctioning storage node.

2. A method according to claim 1, wherein monitoring the two or more other storage nodes comprises the first data storage node listening for heartbeat signals from the two or more other storage nodes.

3. A method according to claim 1, wherein a subsequent data replication procedure is performed based on the first data storage node detecting a data inconsistency with in the data storage system for a file stored at the first data storage node.

4. A method according to claim 1, further comprising maintaining replication list, wherein the replication list includes files that are to be replicated.

5. A method according to claim 4, wherein the replication list includes priorities.

6. A method according to claim 1, wherein the replication process comprises:
    the first data storage node sending a multicast message enquiring whether recipients of the multicast message store the data entity;
    the first data storage node determining whether the data entity is stored on a sufficient number of storage nodes; and
    on condition it is determined that said data entity is not stored on a sufficient number of storage nodes, the first data storage node selecting at least one additional storage node and transmitting the data entity to the at least one additional storage node.

7. A method according to claim 6, further comprising the first data storage node updating said data entity on storage nodes containing obsolete versions of said data entity.

8. A method according to claim 1, further comprising the first data storage node sending a message to one or more storage nodes indicated on the host list, the message including a request to be a master node for the data entity.

9. A method according to claim 1, further comprising the first data storage node monitoring of reading operations carried out in the data storage system.

10. The method according to claim 1, further comprising:
    the first data storage node sending a multicast message to two or more other storage nodes requesting whether the two or more other storage nodes can store the data entity;
    the first data storage node receiving a response from a subset of the two or more other storage nodes;
    the first data storage node selecting at least one storage node from the subset of responding nodes to store the data entity; and
    the first data storage node updating the host list for the data entity to indicate that the at least one storage node from the subset stores the data entity.

11. The method according to claim 1, wherein the node list comprises a list of Internet Protocol (IP) addresses for other storage nodes in the storage group.

12. The method according to claim 11, wherein the node list is associated with a node list version number, the first data storage node monitoring the status of the two or more other storage nodes comprises the first data storage node monitoring for heartbeat signals sent from the two or more other storage nodes.

13. The method according to claim 12, wherein the heartbeat signals comprise a version number for a copy of the node list.

14. The method according to claim 1, wherein the replication process comprises the first data storage node sending one or more of a copy of the data entity or a copy of the host list for the data entity to another storage node for storage.

15. A data storage node for maintaining data in a data storage system that includes a plurality of data storage nodes, the data storage node comprising a processor configured to:

monitor two or more other storage nodes, wherein a node list stored at the data storage node indicates that the two or more other storage nodes are members of a storage group, the data storage node is also a member of the storage group, and each member of the storage group is configured to monitor the other members of the storage group in order to determine whether locally stored data needs to be replicated among the members of the storage group;

detect, based on the monitoring, conditions in the data storage system that indicate that at least one storage node included on the node list is malfunctioning;

perform a local search of host lists stored on the data storage node;

determine that a data entity that is stored on the data storage node is to be replicated based on a host list for the data entity indicating that the data entity was stored on the at least one malfunctioning storage node, wherein the host list for the data entity comprises an associated list identifying a subset of storage nodes within the storage group that store the data entity, and each of a plurality of data entities that are stored on the data storage node are associated with a corresponding host list that indicates which storage nodes store a corresponding data entity; and initiate a replication process for the data entity based on detecting that the at least one storage node is malfunctioning and the host list for the data entity indicating that the data entity was stored on the at least on malfunctioning storage node.

16. The data storage node according to claim 15, wherein the data storage node is further configured to become a master for the data entity during the replication process.

17. The data storage node according to claim 16, wherein the data storage node is configured to create a master host list for the data entity during the replication process.

18. The data storage node according to claim 17, wherein the master host list comprises an indication of which version of the data entity is stored by each storage node included in the master host list.

19. The data storage node according to claim 15, wherein the data storage node is configured to send a copy of the data entity and to send a copy of the host list for the data entity to another storage node.

20. A data storage system comprising at least three data storage nodes organized as a storage group, wherein each data storage node in the storage group comprises a processor configured to:

monitor two or more other storage nodes, wherein a node list stored at the data storage node indicates that the two or more other storage nodes are members of the storage group, the data storage node is also a member of the storage group, and each member of the storage group is configured to monitor the other members of the storage group in order to determine whether locally stored data needs to be replicated among the members of the storage group;

detect, based on the monitoring, conditions in the data storage system that indicate that at least one storage node included on the node list is malfunctioning;

perform a local search of host lists stored on the data storage node;

determine that a data entity that is stored on the data storage node is to be replicated based on a host list for the data entity indicating that the data entity was stored on the at least one malfunctioning storage node, wherein the host list for the data entity comprises an associated list identifying a subset of storage nodes within the storage group that store the data entity, and each of a plurality of data entities that are stored on the data storage node are associated with a corresponding host list that indicates which storage nodes store a corresponding data entity; and initiate a replication process for the data entity based on detecting that the at least one storage node is malfunctioning and the host list for the data entity indicating that the data entity was stored on the at least on malfunctioning storage node.

\* \* \* \* \*